United States Patent

Hsieh

[11] Patent Number: 5,942,866
[45] Date of Patent: Aug. 24, 1999

[54] PWM CONTROL CIRCUIT FOR A DC BRUSHLESS FAN

[76] Inventor: Hsin-Mao Hsieh, No. 6, East Section, Chiao Nan Li, Industrial 6th Rd., Pingtung City Pingtung Hsien, Taiwan

[21] Appl. No.: 09/008,878

[22] Filed: Jan. 20, 1998

[51] Int. Cl.[6] .................................................. H02P 6/08
[52] U.S. Cl. .................................... 318/268; 318/254
[58] Field of Search .................... 318/138, 254, 318/268, 439, 700, 720; 388/809, 811, 816, 819

[56] References Cited

U.S. PATENT DOCUMENTS

| | | | |
|---|---|---|---|
| 4,849,677 | 7/1989 | Kruger | 318/473 |
| 4,893,067 | 1/1990 | Bhagwat et al. | 318/817 |
| 5,364,026 | 11/1994 | Kundert | 318/473 X |
| 5,577,152 | 11/1996 | Chen | 318/804 |
| 5,594,312 | 1/1997 | Schwendemann et al. | 318/799 |

*Primary Examiner*—Bentsu Ro
*Attorney, Agent, or Firm*—Holland & Hart LLP

[57] ABSTRACT

PWM control circuit for a DC brushless fan, including a rectifying circuit which rectifies a voltage signal representative of the rotating speed of the fan, a comparator which compares the rectified voltage signal with a reference voltage signal, and a switching device which is repeatedly closed and opened in accordance with the compared result, is provided, whereby the rotating speed of the fan can be controlled and kept at a constant value.

The reference voltage signal can be generated by a voltage divider formed by a thermistor and a resistor, whereby the rotating speed of the fan can be adjusted as the temperature of the working environment varies.

1 Claim, 1 Drawing Sheet

PWM CONTROL CIRCUIT FOR A DC BRUSHLESS FAN

BACKGROUND OF THE INVENTION

1. Field of the Invention

The present invention generally relates to a PWM (pulse width modulation) control circuit for a DC (direct current) brushless fan and, more particularly, to a speed control circuit for a DC brushless fan.

2. Description of Related Art

Conventional DC brushless fans are only provided with two terminals, i.e., a source terminal and a ground terminal, and thus are usually used in certain circumstances when the requirements concerning the rotating speed of the fan are not strict.

However, when a DC brushless fan is used for heat dissipation of a power supply or a microprocessor chip which generally generate a higher level of heat, the operating conditions of the fan should be observed and controlled so as to effectively facilitate heat dissipation.

In order to avoid the damage to the electronic parts due to poor heat dissipation, a "third terminal" of a DC brushless fan has been utilized. That is, a third terminal (so-called the signal detecting terminal) extending from the internal control circuit of the fan is utilized.

With the utilization of the third terminal of a DC brushless fan, a rectangular wave signal which is synchronous to the variance in the rotating speed of the fan can be detected and connected to external circuits.

SUMMARY OF THE INVENTION

One object of the present invention is to provide a PWM control circuit for a DC brushless fan, whereby the rotating speed of the fan can be controlled and kept at a constant value.

Another object of the present invention is to provide a PWM control circuit for a DC brushless fan, whereby the rotating speed of the DC brushless fan can be adjusted as the temperature of the working environment varies, whereby optimal heat dissipation can be achieved.

In accordance with one aspect of the present invention, a PWM control circuit for a DC brushless fan comprises a rectifying circuit, receiving a voltage signal from a signal detecting terminal of the fan, the voltage signal being a rectangular pulse train of frequency which is proportional to the rotating speed of the fan, and generating a rectified DC voltage signal; a comparator comparing the rectified DC voltage signal and a switching device, connecting at a control terminal with an output terminal of the comparator, connecting at an input terminal with a voltage source and connecting at an output terminal with a source terminal of the fan, and being closed if the rectified DC voltage signal is lower than the reference voltage signal, and being opened if rectified DC voltage signal is higher than the reference voltage signal, whereby the fan is intermittently powered on, and the rotating speed of the fan is controlled and kept at a constant value.

In accordance with another aspect of the present invention, the reference voltage signal is generated by a voltage divider formed by a resistor and a thermistor which are serially connected between the ground and the source voltage.

Other objects, advantages and novel features of the invention will become more apparent from the following detailed description when taken in conjunction with the accompanying drawings.

DETAILED DESCRIPTION OF PREFERRED EMBODIMENT

Figure 1:
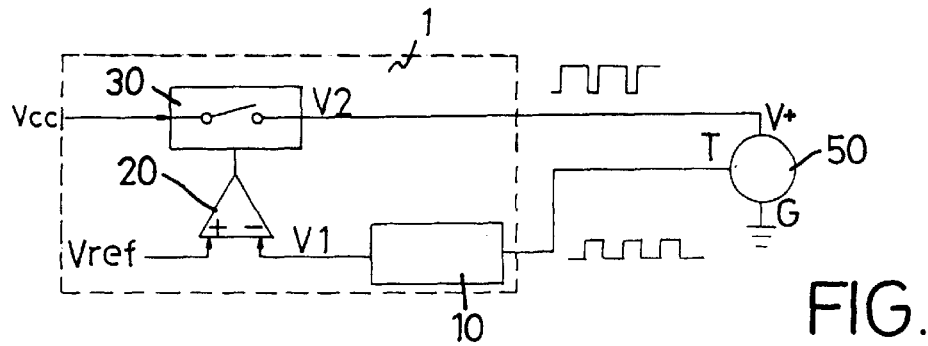
FIG. 1 is a schematic block diagram for illustrating a PWM control circuit for a DC brushless fan in accordance with the present invention.

According to the invention, as shown in FIG. 1, a PWM control circuit 1 for a DC brushless fan 50 comprises a rectifying circuit 10, a comparator 20 and a switching device 30. The fan 50 to be controlled is provided with a source terminal V+, a ground terminal G and a signal detecting terminal T.

In FIG. 1, the input terminal of the rectifying circuit 10 is connected with the signal detecting terminal T of the fan 50, and the output terminal of the rectifying circuit 10 is connected to the inverted input terminal of the comparator 20. The rectifying circuit 10 receives a continuous, rectangular wave signal from the fan 50, which is indicative of the rotating speed of the fan 50, and then sends a rectified and filtered DC voltage signal V1 to the comparator 20.

The non-inverted input terminal of the comparator 20 is connected to a reference voltage signal Vref, which is used for setting the rotating speed of the fan 50, and the output terminal of the comparator 20 is connected to the switching device 30. The comparator 20 compares the rectified DC voltage signal V1 from the rectifying circuit 10 with the reference voltage signal Vref, and then sends a signal to control the switching device 30 according to the compared result.

The switching device 30 is a three terminal device, for example, the switching device 30 is formed by an electronic switch such as a transistor. The switching device 30 is serially connected between a source voltage Vcc and the source terminal V+ of the fan 50, and a third terminal (the control terminal) of the switching device 30 is connected with the output terminal of the comparator 20.

The operation of the switching device 30 depends on the compared result of the rectified DC voltage signal V1 outputted from the rectifying circuit 10 and the reference voltage signal Vref.

When the DC voltage signal V1 outputted from the rectifying circuit 10 is lower than the reference voltage signal Vref, i.e., the rotating speed of the fan 50 is lower than its setting value, the comparator 20 outputs a Logic high value to the switching device 30. Then, the switching device 30 is closed, and the fan 50 is powered on. Thus, the rotating speed of the fan 50 will be increased.

In contrast, when the DC voltage signal V1 outputted from the rectifying circuit 10 is higher than the reference voltage signal Vref, i.e., the rotating speed of the fan 50 is higher than its setting value, the comparator 20 outputs a Logic low value to the switching device 30. Then, the switching device 30 is opened, and the fan 50 is powered off. Thus, the rotating speed of the fan 50 will be decreased In operation, the switching device 30 is repeatedly closed and opened as the rotating speed of the fan varies, thus the fan 50 is intermittently powered on, whereby the rotating speed of the fan 50 can be controlled and kept at a constant value.

Figure 3:
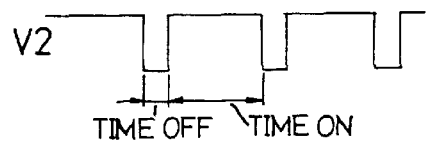
FIG. 3 shows a voltage signal outputted from a switching device of the PWM control circuit in accordance with the present invention.

As shown in FIG. 3, the output signal V2 of the switching device 30 is a rectangular wave, where the width TIME ON represents the period during the switching device 30 is closed and the width TIME OFF represents the period during the switching device 30 is opened. According to the above description of FIG. 1, the widths TIME ON and TIME OFF is modulated so as to control the rotating speed of the fan 50.

Now, referring to FIG. 2, a detailed circuit for embodying the rectifying circuit 10 in FIG. 1 is described as below. In the rectifying circuit 10, the DC voltage component of the detected rectangular signal from the terminal T of the fan 50 is isolated by a capacitor 11. Then, the detected signal without a DC voltage component is rectified by two diodes 12 and 13 which function as a half-wave rectifier, and is filtered by an RC filter formed by a resistor 14 and a capacitor 15.

Figure 4:
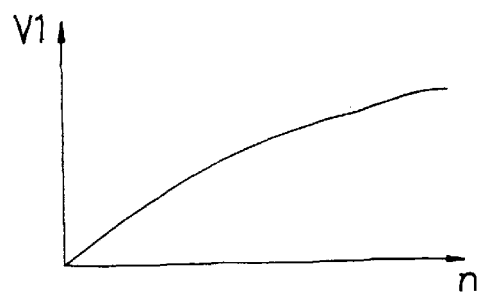
FIG. 4 illustrates the characteristic of a rectifying circuit of the PWM control circuit in accordance with the present invention.

As a result, the detected signal from the fan 50 can be converted into a rectified and filtered DC voltage signal V1 which is substantially proportional to the rotating speed n of the fan 50 (as shown in FIG. 4).

Figure 2:
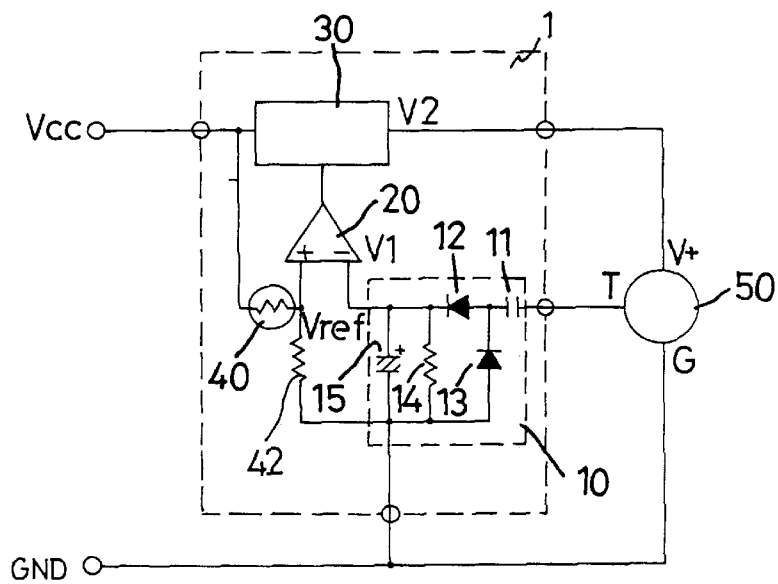
FIG. 2 is a detailed circuit diagram for embodying the PWM control circuit of FIG. 1.

Preferably, referring to FIG. 2, the reference voltage signal Vref is generated by a voltage divider formed by an NTC (negative temperature coefficient) thermistor 40 and a resistor 42 which are serially connected between the source voltage Vcc and the ground GND.

When the temperature of the working environment increases, the resistance of the NTC thermistor 40 will decrease, and thus the divided reference voltage signal Vref will be increased. That is, the setting value of the rotating speed of the fan 50 will be increased as the temperature of the working environment increases.

In contrast, the setting value of the rotating speed of the fan 50 will be decreased as the temperature of the working environment decreases.

As the NTC thermistor 40 serves in a temperature compensating role, the rotating speed of the DC brushless fan 50 can be adjusted as the temperature of the working environment varies, and thus optimal heat dissipation can be achieved.

In another embodiment (not shown), if the temperature compensation is not required, then the reference voltage signal Vref may be simply generated by a voltage divider formed by two resistors which are serially connected between the source voltage Vcc and the ground GND.

Although the present invention has been described with respect to certain preferred embodiments, it is to be understood by persons skilled in the art that various modifications, alternations and substitutions can be made without departing from the spirit and scope of the invention defined in the appended claims.

What is claimed is:

1. A PWM control circuit for a DC brushless fan, said fan being provided with a source terminal, a ground terminal and a signal detecting terminal, said circuit comprising:

a rectifying circuit, receiving a voltage signal from said signal detecting terminal of said fan and generating a rectified DC voltage signal, said voltage signal being a rectangular pulse train of frequency which is proportional to a rotating speed of said fan, and said rectifying circuit comprising a half-wave rectifier formed by two diodes, an RC filter formed by a resistor and a first capacitor, and a second capacitor which isolates the DC voltage component existing in said received voltage signal;

a comparator, comparing said rectified DC voltage signal with a reference voltage signal, said comparator comprising an operational amplifier, and said reference voltage signal being generated by a voltage divider formed by a thermistor and a resistor; and an electronic switching device comprising a transistor, connecting at a control terminal with an output terminal of said comparator, connecting at an input terminal with a voltage source and connecting at an output terminal with said source terminal of said fan, and said electronic switching device being closed if said rectified DC voltage signal is lower than said reference voltage signal, and being opened if said rectified DC voltage signal is higher than said reference voltage signal, whereby said fan is intermittently powered on, and the rotating speed of said fan is controlled and kept at a constant value.

* * * * *